May 9, 1967 J. R. CAVANAGH 3,318,453

REVERSIBLE FILE HOLDER

Filed Feb. 25, 1965

Inventor

JOHN RICHARD CAVANAGH by: Cavanagh & Norman 3,318,453
REVERSIBLE FILE HOLDER

John Richard Cavanagh, Toronto, Ontario, Canada, assignor to International Arms Limited, Nassau, Bahamas Filed Feb. 25, 1965, Ser. No. 435,177
4 Claims. (Cl. 211—11)

This invention relates to a reversible file holder for use in handling or classifying files in office operations wherein the files are required to be transported with correspondence, as for example, in governmental offices relating to taxation and patents, insurance offices, legal and accounting and the like.

In office operations where correspondence must move with files, filing systems have been devised where in each matter case or client is assigned a particular docket identification. The processing of correspondence and the seeking of files relating thereto is encumbered in such operations by difficulty in discovering the identitiy of files in transit. In some large governmental and insurance offices carts are provided for moving current files in transit and supporting them in such manner that an individual file may be discovered while in transit. During mail processing, especially during mail receiving operations, the discovery of files in transit requires an inordinately larger portion of time than the filing of correspondence in files which are in current file cabinet storage. The greatest single attendant disadvantage in the finding of current files is the substantially universal tendency of stacking same in superposed relationship on office desks. The elimination of this factor alone therefore renders a substantial efficiency in operations and embodies one of the main objects of this invention.

It is another object of this invention to provide a file holder of unitary structure with no moving parts, of such ultimate simplicity that it may be manufactured at least cost to permit its substantial use.

It is a further object of the invention to provide a file holder so proportioned that it provides substantial utility for holding a few files in upright relationship but which when reversed, that is, flipped over, is adapted to hold substantially many more files.

It is a further object of the invention to provide a file holder adapted for a variety of uses in office practice, as for example, in assisting the holding of files in storage cabinets, enabling the carrying of files in a more convenient manner, enabling rigid storage at least cost and enabling classification and identification of groups of files, departments or purposes by colour if desired.

Other objects of the invention will be appreciated by a study of the following specification taken in conjunction with the accompanying drawings.

Figure 5:
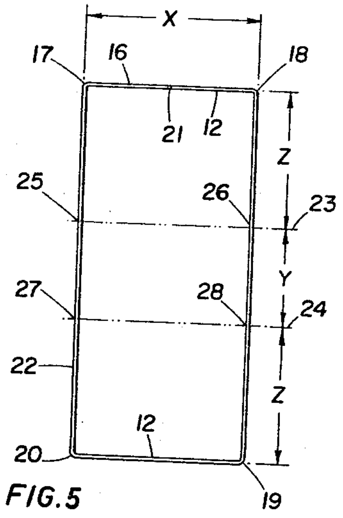

FIGURE 5 indicates one method of making the file holder of the invention.

Figure 1:
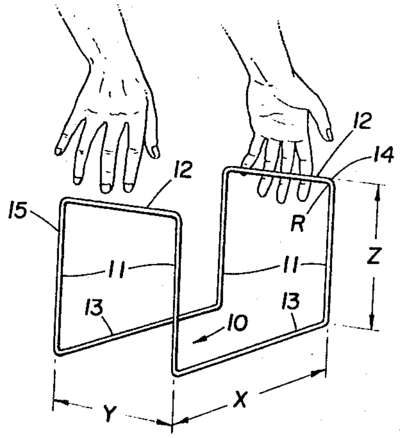
FIGURE 1 is a perspective view of the file holder of the invention revealing the same about to be grasped by the hands of a user.

Referring to the drawings, and particularly FIGURE 1, the file holder 10 of the invention is preferably formed from an inexpensive metal such as mild steel of the order of about ¼ inch diameter for the purpose of providing sufficient weight and rigidity, but not too much thereof. The structure is in the form of the four parallel spaced apart upright members 11 which may hereinafter be referred to as "legs" as distinct from the parallel spaced apart support members 12 connecting two pairs of ends of said legs or uprights and the parallel spaced apart support members 13 extending between the other pairs of the other ends of said legs. It is important to this invention that certain proportions be adhered to in order to achieve practical utility in file handling and thus the dimension Z defines the height of the legs or uprights, dimension X the length of support members 13, and dimension Y the length of support members 12. Each of the legs terminates at a support member by means of a radial bend 14 of a radius of about 2 diameters or more of the diameter of the body material or continuous length of rod 15 from which the file holder is made.

One method of fabricating the file holder according to the invention is illustrated in FIGURE 5 wherein the dimensions X, Y and Z are defined relative to a single length of rod 16 bent at radius corners 17, 18, 19 and 20 to form a rectangle in which the ends of the rods are preferably joined by welding such as at 21, that is, in the shorter support member 12.

By symmetrically locating the weld 21 in the rectangular configuration 22 relative to the geometry thereof, special operations on production are avoided. Preferably, however, the weld should be located within one of the upright legs 11, that is, within the dimensions Z of the rectangle 22. In FIGURE 5 will be found axes 23 and 24 in parallel spaced relation transversely of the rectangular configuration and being distant from one another a dimension Y and distant from the ends defined by dimension X by the dimension Z. The axes 23 and 24 represent bending axes for the rectangular configuration whereby simple bending apparatus may effect the right angular radius bends at 25, 26, 27 and 28, to provide the final form shown in FIGURE 1. The file holder structure is then preferably coated with an enamel, fully baked to provide a non-marring, hard, unchippable finish, available from conventional enamel coatings. The invention also contemplates in combination an elastomer class of plastic coating as for example of the kind employed on wire formed kitchenware and the like. The invention further contemplates in combination with said structure a coating of distinctive colour and the provision of sets of said holders of different colours for identification and sorting purposes in mail handling and the like.

Figure 2:
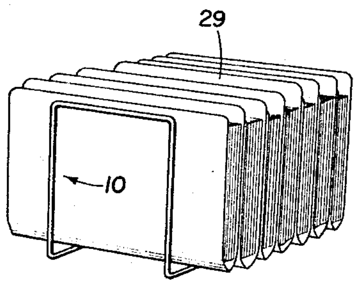
FIGURE 2 is a perspective view of the file holder of the invention supporting a large number of files in display manner.
Figure 3:
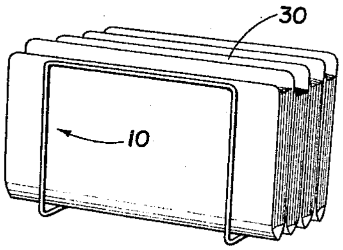
FIGURE 3 is a perspective view of the file holder of the invention flipped over from the position indicated in FIGURE 2 and adapted thereby to support a small number of files.

As indicated in FIGURE 2 the file holder 10 of the invention, when set up to present its larger dimension for file access, is available to support a substantial number of files 29. While only 7 files are shown in this position of the file holder, the proportions of the file holder as produced are such as to provide for the holding and supporting of upwards of 20 or more files. In the alternative position of the file holder of the invention illustrated in FIGURE 3, the holder 10 is shown presenting its narrower accommodation dimensions for a smaller number of files 30.

Preferably the relationship between the dimensions of the file holder of the dimensions are such that the dimension Z is less than the width of a conventional file and preferably of the order of about between 6 inches and 9 inches. The dimensions X and Z are different, the one being greater and the other less than the dimension Z, but wherein the greater of the two is less than the length of the file to be handled, and the smaller is not less than about ¼ of the length of the file to be handled. Convenient dimensions for X, Y and Z are illustrated in the following:

| Inches | | |
|---|---|---|
| Y | Z | X |
| 6 | 8 | 10 |
| 6 | 6 | 10 |
| 6 | 6 | 9 |
| 5 | 7 | 9 |
| 5 | 7 | 10 |

The above table represents outside dimensions and ranges of proportions which are adapted for the handling of both legal and standard sizes of files. In the case of standard size of files, however, the dimension X is best reduced to about 9 inches for the transporting of a few number of files. Since this utility is least with this kind of file, the overall best range in size is substantially represented by the figures 6, 8 and 10, especially in view of the adaptabiilty of these proportionate dimensions of other use such as handling of books and especially the storing of periodicals on shelves whereby the binding of periodicals may be obviated.

Figure 4:
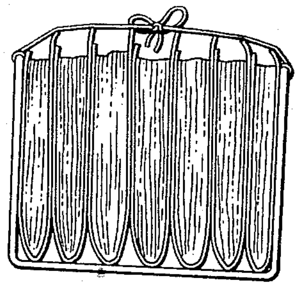
FIGURE 4 illustrates the manner of using the file holder of the invention for storage purposes, rendering unnecessary separate storage cabinets and adapted to support files for rigid stacking.

In FIGURE 4 is illustrated a method by which the file holder of the invention may be employed for rigid storage to obviate the use of file cabinets of any kind for such purposes. The files are bound into the file holder and identified and preferably a cover such as a paper bag or a plastic enclosure is tied thereover and marked, thus maintaining such files in safe and rigid long term storage in a package size adapted to be transported readily and with convenience if required. In addition, the storage units are thus confined to units of storage with respect to which the necessary care can be applied for future identification and discovery. The rigid nature of the file holder of the invention lends to such files so tied and packaged such rigid characteristic that they may be stacked upon one another to full room depth without concern for damage to files.

In a further utility the invention finds application to the support of files within a conventional filing cabinet itself. In this respect the file holder herein is so proportioned and dimensioned as to fit into any legal or standard size filing drawer. As has frequently been observed, the removal of a few files of a series from a relatively loaded file drawer will often require considerable effort from the file attendant to hold the remaining files upright while moving the back plate of the file drawer sufficiently forward to support the files remaining. The placement of one file holder of the invention in an intermediate location within the file drawer obviates this disadvantage and prevents file slippage.

Again, certain groups of files, especially in secret governmental matters and the like, may be carried together in a file holder, serviced and returned to the file drawer wtihin file holder itself. The reversible feature of the file holder enables a maximum of flexibility separating and splitting up groups of files, especially in mail sorting and handling.

Generally, the proportions of the file holder of the invention will be found useful if Z is of a value between one-half and the full width dimension W of the size of file to be handled, and Y is of a length between one-half W and Z, and X is of a length between about Z and about one-and-one-half W, while preferably X and Y are different.

What I claim is:

1. A reversible file holder comprising in combination: a continuous length of rigid material of uniform cross-section, bent to define four parallel spaced apart leg members of an equal length dimension Z; two parallel spaced apart support members of a dimension X connecting opposite pairs of the same ends of said legs; and two other support members of a different dimension Y extending between the other opposite pairs of said legs at the other ends thereof in parallel spaced apart relationship, but at right angles to said first mentioned support members, the dimensions X, Y, and Z being proportioned relative to the width W of a file to be handled thereby and wherein Z is of a length between $W/2$ and W, X is of a length between $W/2$ and $3W/2$, and Y is of a length between $W/4$ and $W/2$, and wherein X is greater than Z and Z is greater than Y.

2. A reversible file holder as claimed in claim 1 in which the dimensions X, Z and Y are substantially in the proportions 10:8:6.

3. A reversible file holder as claimed in claim 1 in which the continuous length of rigid material thereof is defined by mild steel rod of about ¼" uniform diameter welded at a point making a continuous length thereof within one of said support members.

4. A reversible file holder as claimed in claim 1 and a coating thereon of distinctive colour adapted for classification and identification of objects supported by said holder.

References Cited by the Examiner

UNITED STATES PATENTS

| | | | |
|---|---|---|---|
| 400,138 | 3/1889 | Steinberger | 24—261 |
| 1,308,031 | 7/1919 | Bell | 211—49 |
| 3,161,391 | 12/964 | Bahnsen | 248—99 |
| 3,208,456 | 9/965 | Peebles | 129—16 |

CLAUDE A. LE ROY, *Primary Examiner.*

CHANCELLOR E. HARRIS, *Examiner.*

K. J. WINGERT, *Assistant Examiner.*